INVENTORS.
TESEO BRUNO DANTE TERRONI
JOHN ERNEST THOMAS PARKER
BY
Chas. W. Candy
ATTORNEY

ELECTRICAL SIGNALING SYSTEM

Filed March 5, 1947 3 Sheets-Sheet 2

INVENTORS.
TESEO BRUNO DANTE TERRONI
JOHN ERNEST THOMAS PARKER
BY
Chas. W. Candy
ATTORNEY April 24, 1951 T. B. D. TERRONI ET AL 2,550,312

ELECTRICAL SIGNALING SYSTEM

Filed March 5, 1947 3 Sheets-Sheet 3

INVENTORS.
TESEO BRUNO DANTE TERRONI
JOHN ERNEST THOMAS PARKER
BY
Chas. W. Candy
ATTORNEY Patented Apr. 24, 1951

2,550,312

UNITED STATES PATENT OFFICE 2,550,312

ELECTRICAL SIGNALING SYSTEM

Teseo Bruno Dante Terroni and John Ernest Thomas Parker, Liverpool, England, assignors to Automatic Telephone & Electric Company Limited, Liverpool, England, a British company Application March 5, 1947, Serial No. 732,574
In Great Britain March 6, 1946

12 Claims. (Cl. 179—1)

Figure 2:
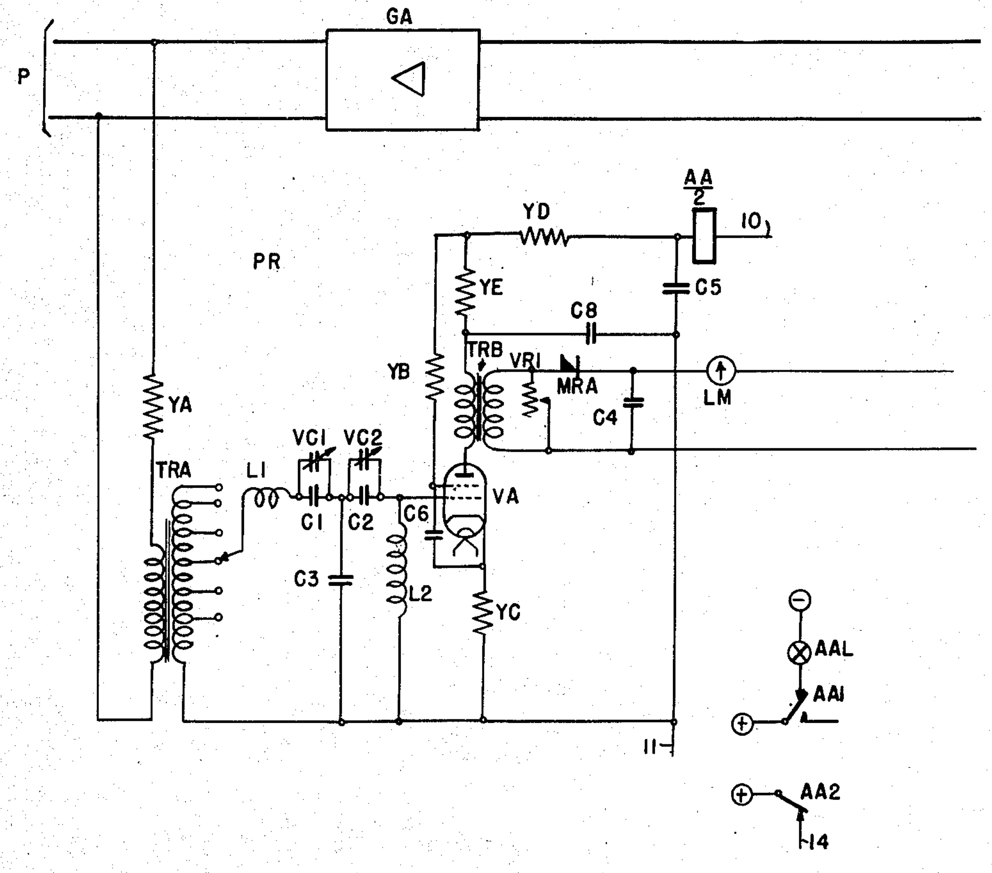

The present invention relates to electrical signalling systems employing modulated carrier currents for the transmission of information over a transmission circuit and is more particularly concerned with systems having automatic gain control arrangements operative in response to changes in the attenuation of the transmission circuit.

In the usual automatic gain control circuits, if a sudden change of more than a predetermined value takes place in the line attenuation, no automatic gain control occurs but an alarm signal is given to attract the attention of the supervising personnel who will attend to the equipment on the assumption that a fault has occurred. The predetermined value of the changes permissible before an alarm is given may, however, be reacted in conditions other than fault conditions. For example, abnormal weather conditions may often give rise to sudden changes which may be greater than the predetermined value but which do not require supervision. Thus it is found that due to heavy snowfall a considerable amount of line loss will have to be compensated by increase of gain but such increase should be allowed to take place automatically without calling a supervisor.

One of the objects of the present invention is to provide a system using automatic gain control which is more flexible than previous systems in that it is able to discriminate between changes due, for instance, to abnormal weather conditions and those due to fault conditions.

According to one feature of the invention, in response to a change in the attenuation of the transmission circuit, the automatic gain control arrangements are adapted to initiate a predetermined maximum correction which is less than the total maximum correction of which the arrangements are capable.

According to a further feature of the invention, in response to a change in the attenuation of the transmission circuit, the automatic gain control arrangements are adapted to initiate a predetermined maximum correction and to effect the required correction if it is less than the predetermined maximum or to give an alarm if the required correction is greater than the predetermined maximum.

According to another feature of the invention, in response to an abnormal change in the attenuation of the transmission circuit, the automatic gain control arrangements are adapted to effect a predetermined maximum correction and then determine whether the correction still to be made exceeds a predetermined amount.

According to yet another feature of the invention, in response to an abnormal change in the attenuation of the transmission circuit, according to the setting of one or more variable controls, the automatic gain control arrangements, either are prevented from applying a correction and an alarm is given or are capable of effecting a correction of a predetermined maximum amount in one or both directions.

According to a further feature of the invention, in response to a change in the attenuation of the transmission circuit, the automatic gain control arrangements are adapted to initiate a predetermined maximum correction which is effected by the step-by-step operation of an automatic switch under the control of a timing device which is so adjusted that the switch is capable of taking such a number of steps as to provide the predetermined maximum correction.

The invention is described with reference to a terminal station in a carrier current transmission system but on a long line, particularly of the openwire type, it may with advantage be employed at one or more intermediate repeater stations.

Figure 1:
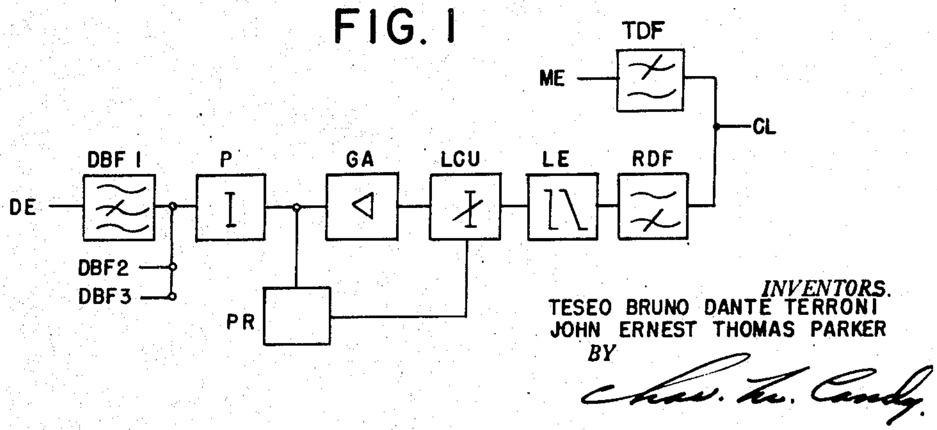
Figure 3:
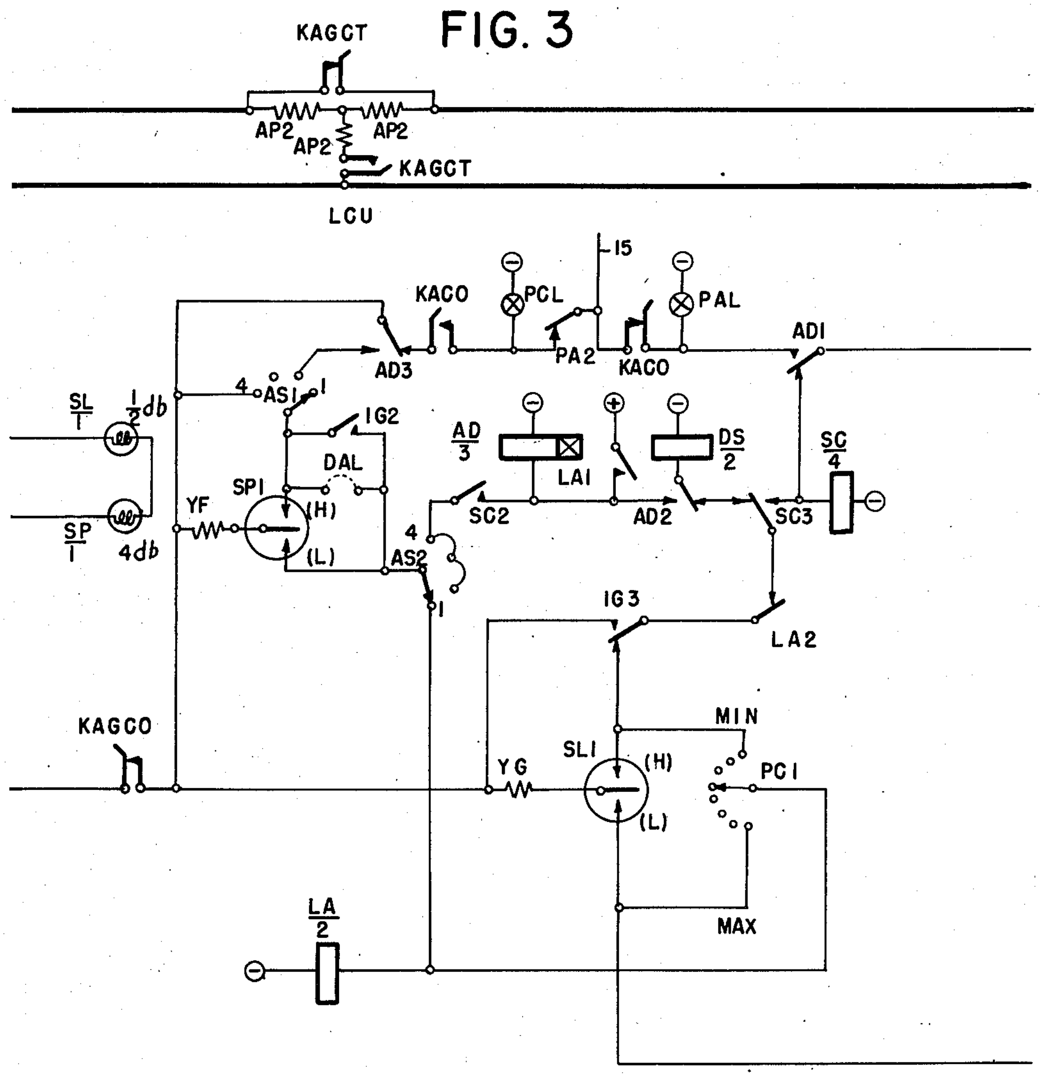
Figure 4:
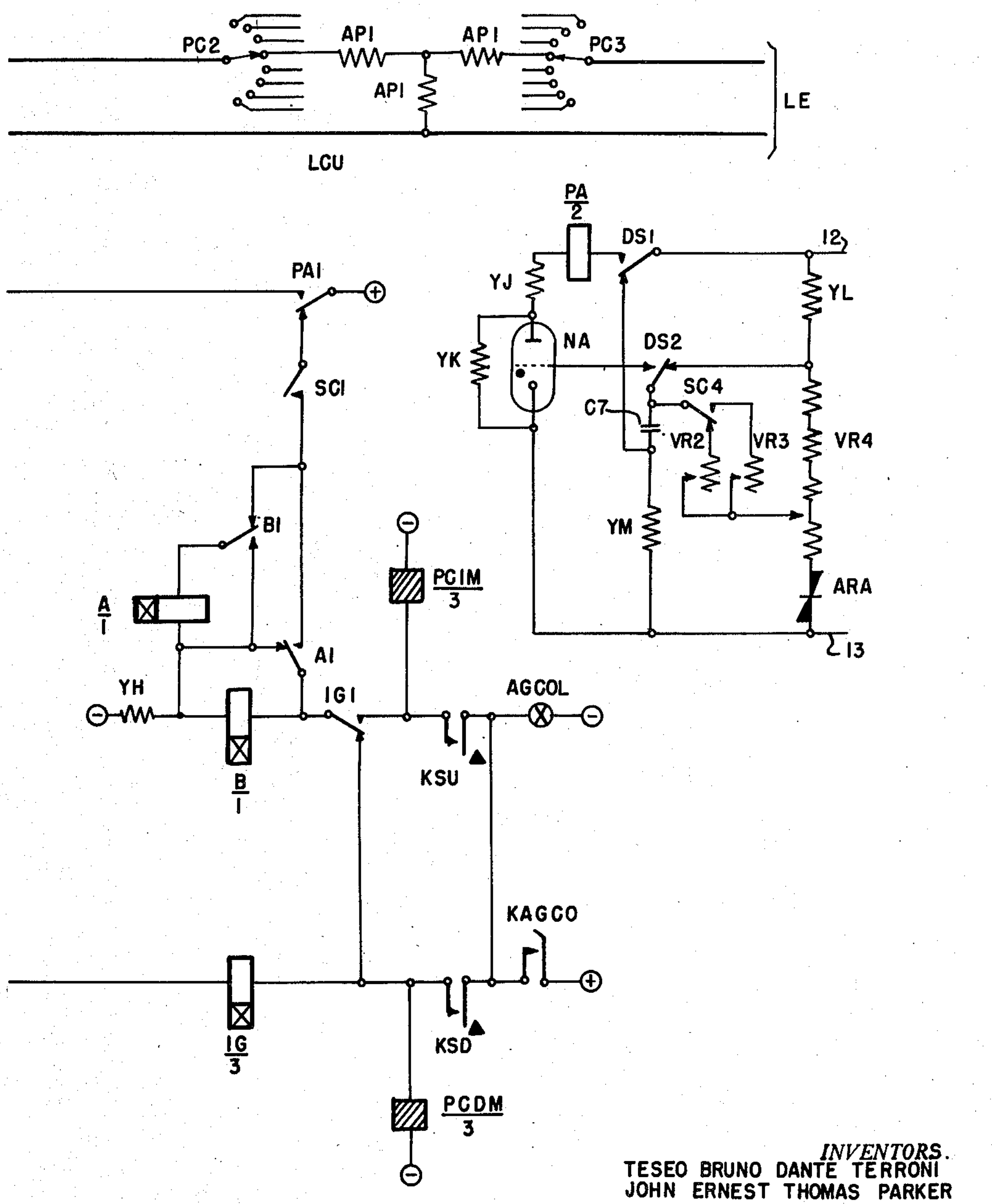

The invention will be better understood from the following description of one example taken in conjunction with the accompanying drawings comprising Figs. 1 to 4 of which Fig. 1 shows a block schematic of part of the terminal equipment of a three channel carrier system while Figs. 2 to 4 when placed side by side with Fig. 2 on the left show the complete circuit diagram of the automatic gain control arrangements.

Referring to Fig. 1, outgoing modulated carrier signals are transmitted to the carrier line CL by way of the transmitting directional filter TDF which connects with the three modulated equipments on lead ME.

As regards reception the incoming modulated carrier signal is extended from the carrier line CL to the receiving directional filter RDF whence the side band frequencies are passed to the directional line equaliser LE which compensates for the relatively higher losses occurring at high frequencies. The signal is now fed to the level control unit LCU which is part of the gain control arrangments. From here the signal is applied to the group amplifier GA and then via the attenuation pad P to the demodulator band-pass filters DBF1—3. The latter connects with three demodulating equipments over leads such as DE.

For the purpose of automatic gain control, the incoming signal is tapped off the group amplifier GA and fed to the pilot receiver PR, where a band-pass filter selects the pilot frequency. The pilot frequency is amplified and then rectified to give a direct current voltage proportional to the amplitude of the pilot frequency. It will be understood that any change in the line attenuation will give rise to a corresponding change in the amplitude of the pilot frequency and hence to a change in the D. C. voltage. The change in the D. C. voltage is employed to control the attenuation of a variable attenuation pad in such a manner as to compensate for the change in the line attenuation giving rise to the change in the D. C. voltage. In the local D. C. circuit there are three components; a level meter calibrated in decibels which indicates directly the signal level of the pilot frequency and two sensitive relays of the contact voltmeter type, one of which closes its contacts due to a change in D. C. voltage corresponding to $\pm\frac{1}{2}$ db. change in the line attenuation and the other which closes its contacts due to a $\pm 4$ db. change in line attenuation.

The $\frac{1}{2}$ db. relay controls a stepping switch (hereinafter referred to as the pad control switch) with a forward and reverse drive which compensates for changes in line attenuation to within half a decibel over a rang of $\pm 10$ db. from normal by introducing, as previously mentioned, loss pads progressively increasing or decreasing in $\frac{1}{2}$ db. steps.

The 4 db. relay is used for gain control purposes and for instituting alarm signals, to be referred to later, when large changes in line attenuation occur suddenly.

An initial delay of the order of 6, 12, 18 or 24 seconds precedes the operation of the pad control switch to effect line compensation. The initial delay is necessary to prevent operation of the equipment by momentary line attenuation changes. The delay time is variable to cater for the condition where the arrangements are provided at a repeater station or stations in addition to the terminal stations on a long line. If the time delay is fixed in such a case then with a change of attenuation in, say, the first line section, the arrangements in subsequent line sections would commence operation at the same time. If the time delays of the successive AGC arrangements are staggered, it can be arranged that the AGC of the first line section will become operative first to correct the overall gain before the AGC as the succeeding sections begin to operate. Such an arrangement leads to minimum AGC operation and more uniform conditions along the line.

An alarm signal is given by the 4 db. relay under one of the following conditions, according to the setting of two preset controls:

1. With a sudden change of $\pm 4$ db, or more in the line attenuation the pad control switch stepping circuit is disconnected, the delay circuit reset and after the delay interval (equal to initial delay time) the alarm is given.

2. As in the previous case but the alarm is given when the gain of the system is required to be increased by 4 db. or more. In the direction of decreasing gain, the pad control switch is permitted to step to its minimum position and a limit alarm is then given if a further change is required.

3. With a sudden line change of $\pm 4$ db. or more, pad control switch is permitted to step (say) 8 times, i. e. a 4 db. change, and if the level is not then corrected, the switch is stopped and the alarm given.

4. As in the previous case but the alarm is given in the direction of increasing gain only; in the direction of decreasing gain the switch is permitted to step to its limit position.

5. With a sudden line change of $\pm 4$ db. or more, pad control switch is permitted to step (say) 6 times, i. e. 3 db.; if then the level is 4 db. or more from normal an alarm is given, but if the level is 4 db. or more from normal the switch is permitted to step until the level is again normal.

6. As in the previous case but the control and alarm operate in the direction of increasing gain only, while in the direction of decreasing gain and pad control switch is permitted to step to its limit position.

7. With any line change, the pad control switch is permitted to step only (say) 8 times, i. e. a change of $\pm 4$ db., and if the level is not then normal an alarm is given.

8. As in the previous case but the control and alarm operate in the direction of increasing gain only, while in the direction of decreasing gain, the pad control switch is permitted to step to its limit position.

The facility whereby in the direction of decreasing gain the pad control switch is permitted to step to its limit position is useful when weather conditions are known to be improving in which case the line attenuation will decrease steadily by possibly 8 or 10 db. to normal so that alarms constitute an unnecessary demand on supervision.

A detailed description will now be given of the circuits shown in Figs. 2, 3, and 4, Fig. 2 showing the circuit of the pilot receiver PR while Figs. 3 and 4 show the circuit of the level control unit LCU.

*Pilot frequency receiver PR*

Referring to Fig. 2, the high tension supply is connected to leads 10 and 11 which are positive and negative potential respectively. The incoming signal is tapped off the group amplifier GA and applied to primary winding of transformer TRA and passed by the tapped secondary winding to the pilot frequency selecting filter. The transformer has a step-down ratio of 11 to 1 to reduce the bridging loss of the circuit in the transmission line.

The selecting band pass filter has two capacity-coupled, temperature-compensated, series resonant circuits comprising inductance L1/capacity C1 and inductance L2/capacity C2 tuned to the particular pilot frequency. Variable condensers VC1 and VC2 provide fine adjustment for tuning. A feature of this type of circuit is the high degree of selectivity, while at the pilot frequency the response curve is flattened or double-humped, depending upon the ratio of the value of the tuned circuit condensers to the coupling condenser C3. In this particular embodiment, however, the ratio or coupling factor is so chosen as to give a single flat-topped response curve at the pilot frequency with an attenuation of at least 20 db. at 250 cycles above or below the pilot frequency.

The pilot frequency voltage developed across inductance L2 is passed to the grid of the amplifying valve VA where the signal is amplified and fed to the meter circuit via the output transformer TRB in the valve anode circuit. A small amount of negative feedback is produced in the amplifying stage by the bias resistor YC in the cathode circuit, the amount of feedback being sufficient to stabilise the gain of the unit with varying power supplies, and to maintain the gain within approximately ½ db. for different valves.

The rectifier MRA in the secondary circuit of the anode transformer TRB converts the amplified pilot frequency signal into a direct current signal which actuates two sensitive relays SL and SP of the contact voltmeter type in series with the pilot level indicating meter LM. The variable resistance VR1 across the secondary winding of transformer TRB provides a fine control in addition to the gain adjustment obtained from the 3 db. tappings on the secondary winding of the input transformer TRA. VR1 controls the gain without affecting the response characteristics of the amplifying stage, or affecting the D. C. response characteristic of the rectifier and meter circuit.

When the arrangement is being calibrated initially the incoming band-pass filter is tuned to the actual pilot frequency and then the gain is adjusted until the level indicating meter LM reads "O" db. Under this condition the current developed will be of the order of, say, 130 micro amps. and the armatures of the sensitive relays SL and SP would lie centrally between their respective contacts.

Any change in the line attenuation of the carrier system alters the level of the incoming pilot frequency and produces a proportionate change of the D. C. voltage in the meter circuit. The level indicating meter calibrated in decibels indicates the value of the change and one or both of the sensitive relays SL and SP may be actuated. The function of these relays will be described in detail later but before proceeding with the description relating to compensation for line attenuation, an explanation of the time-delay circuit element of the level control unit is necessary.

*Time-delay circuit element*

As previously stated it is necessary to precede any correction of the line attenuation by a predetermined delay, hereinafter termed the initial delay. Another delay is utilised under some of the eight alarm schemes to permit the pad control switch to step a predetermined number of times during the delay. This time-delay is hereinafter referred to as the stepping interval.

The high tension supply for the time-delay circuit element is connected to leads 12 and 13 which are positive and negative potential respectively. In its quiescent state the condenser C7 is charged to approximately 50 volts (positive on the lower plate in the circuit and negative on the upper plate) through contacts DS1 in their normal position by the voltage developed across the tapped potential divider which comprises resistance YL, variable resistance VR4 and disc ARA connected in series. Disc ARA may comprise non-linear discs or elements of like formation of the carborundum-ceramic type such as described in the United States Patent 2,292,977, page 3, column 2, lines 21 through 37.

When relay DS is operated (as later explained) the polarity of the potentials applied to condenser C7 is reversed and it will first discharge and then re-charge to the opposite polarity at a rate determined by the series resistances VR2 and YM.

In addition, contacts DS2 of relay DS connect the condenser C7 in series with resistor YM, between the control grid and the cathode of the cold-cathode neon tube NA, and at contacts DS1, connect high tension positive battery to relay PA in series with resistance YJ in the anode circuit of the tube.

When the voltage across the condenser reaches the breakdown voltage of the tube (say 75 volts) the tube strikes and current passes in the anode circuit to operate relay PA. The utilisation of the contacts of relay PA will be explained later.

Predetermined initial delay times over a wide range are available by appropriate adjustments on the variable resistances VR2 and VR4, the preferred values of the delay being 6, 12, 18 or 24 seconds.

The circuit is prepared for the stepping interval delay by the operation of relays DS and SC. Contacts SC4 disconnects the variable resistance VR2 and replaces it by VR3 which is preset to give the necessary discharging and charging rate for condenser C7 and the consequent delay in the operation of relay PA.

*The pad control switch (PC)*

This is a selector switch with two driving magnets PCIM and PCDM for forward or reverse stepping of the wipers. In its preferred form the PC switch has 41 wired band positions, each position connecting a loss pad such as AP1 in the receiving path of the carrier system. The pads range from 0 to 20 db. in ½ db. steps, and, with the line attenuation at its normal value, the PC switch is positioned to bring the 10 db. pad into the line. Provision is therefore made for compensating for up to ± 10 db. variation of line attenuation in ½ db. steps.

*Operation with 1 db. increase in line attenuation*

Assume that the line attenuation has increased by 1 db. from the normal value. This reduces the level of the received pilot frequency by the same amount, the pilot receiver thereby causing the SL relay to close its SL1(L) contacts.

Positive battery is then extended from the operated contacts AA1 (Fig. 2) of the pilot receiver anode alarm relay AA by the SL1(L) contacts of relay SL through relay IG and magnet PCDM. Relay IG only operates and at IG3 completes a circuit for relay DS from positive battery, AA1, KAGCO, IG3, LA2, SC3, AD2, winding of relay DS, negative battery. At operated contacts DS1 and DS2 the time delay circuit functions as previously described and after the predetermined delay period relay PA in the anode circuit of the neon tube operates and at PA1 operates relay SC. Relay SC locks over SC3 to the positive battery at AA1, and releases relay DS. Relay DS in releasing at DS1 normal releases relay PA and resets the timing circuit.

With contacts PA1 in their normal position a circuit is completed for the slow operate relay A from positive battery, PA1, SC1, B1, winding of relay A, YH to negative battery. At contact A1 positive battery is extended to the "increase" magnet of the PC switch (PCIM) and to relay B.

The wipers of the PC switch are stepped to the next position bringing in circuit the 9.5 db. pad in place of the 10 db. pad which was the condition of normal line attenuation applied initially.

Relay B operates, and at operated contacts B1 disconnects and shunts down relay A. Relay A thereupon releases, and at normal contact A1 disconnects and shunts down relay B and de-energises PCIM.

In this condition the level of the incoming pilot frequency will have been increased by ½ db. but the contacts of relay SL remain closed holding relay IG, since an increase of 1 db. is required. The PC switch is stepped once again by the action of relays A and B, to bring in circuit the 9 db. pad. The level of the pilot frequency will now be normal again, thereby causing relay SL to restore and release relay IG. Relay IG at normal contacts IG3 releases relay SC to disconnect the switch stepping circuit.

Should the line attenuation decrease by 1 db. then the level of the incoming pilot frequency would be increased by the same amount, the pilot receiver, causing relay SL to close its SL1(H) contacts. In this case relay DS is operated direct from the SL contacts, and the PC switch is subsequently stepped in the direction of decreasing gain by the interaction of relays A and B, and by the energisation of the "decrease" magnet of the PC switch (PCDM) through the normal contacts of relay IG.

*Limit alarm*

If and when the PC switch reaches either its minimum or maximum position due to changes in line attenuation and a further pad change in the same direction becomes necessary, further stepping is prevented, and an alarm is given after a time interval equal to the initial delay period.

Thus if the PC switch is in its limit position and the SL1(L) or SL1(H) contacts are closed indicating that a further change is necessary in the same direction, relay LA operates.

Relay LA at LA2 disconnects relay DS or SC if the latter is operated, causing the timing circuit to be reset and the PC switch to be prevented from stepping further by the opening of its stepping circuit at SC1. At LA1 a circuit is completed for the slow-operate relay AD which in operating re-operates relay DS.

Operated contacts of relay DS cause the timing circuit to function, and after the delay time relay PA operates.

Positive battery is connected via PA1 and AD1 to lead 15 to give an external alarm, and to the pilot alarm lamp PAL on the "level control" unit.

The maintenance officer may disconnect the external alarm by operating the alarm cut-off key KACO, but the pilot alarm lamp remains lighted so long as the alarm condition persists.

When now the line attenuation changes to require the PC switch to step in the opposite direction, relay SL "changes-over" closing its contact opposite to the one operated in the alarm condition. Relay LA is, therefore, released, and opens the circuit of relays DS and AD. Relay DS releases and remains normal until relay AD (slow release) returns to normal. During this interval the time delay circuit is reset and relay PA released.

With PA normal the pilot alarm lamp is extinguished. Positive battery at AA1 is extended to the external alarm circuit lead 15 by AD3 and PA2 normal and KACO operated. The pilot clear lamp PCL is also lighted from the same positive battery to call the attention of the maintenance officer, who, on restoring KACO disconnects the external alarm and extinguishes the pilot clear lamp.

*Operation of alarm circuit with sudden large line attenuation changes*

*Case 1.*—For this the manually operated selecting switch AS is set in position 1, and the link DAL is inserted.

If, now, the line attenuation changes by less than ± 4 db. the level is corrected under the control of the ½ db. relay SL as previously explained.

When the line changes suddenly by ± 4 db. or more, relay SP assumes control of the pilot receiver and closes either its SP1(H) or SP1(L) contacts (for a decrease or increase in line attenuation respectively). Positive battery at AA1 is extended by way of the closed contact relay SP to operate relay LA. As described previously relay LA releases relay DS or SC to prevent the PC switch from stepping further, and controls the time delay circuit which after a delay interval equal to the initial delay, gives the alarms.

*Case 2.*—In this case the selecting switch AS is set in position 1, and the link DAL omitted so that the alarm condition described under case 1 functions only when the line attenuation increases by 4 db. or more (requiring an increase in gain of the equipment), and the pilot receiver causes the SP1(L) contacts to close. In the other direction i. e. when the line attenuation is decreased by 4 db. or more, although the SP1(H) contacts are closed they perform no function, and under the control of the ½ db. relay SL the PC switch is permitted to reduce the gain of the circuit and step to its minimum limit (MIN contact) position if necessary.

*Case 3.*—In this case switch AS is set in position 2 and the link DAL also inserted. When there is a line change of ±4 db. or more relay SP closes its contacts one way or the other. At the same time, the ½ db. relay SL closes one of its contacts to start the time-delay equipment. At the end of the initial delay period relay PA operates to operate relay SC, and commence the stepping of PC switch.

When relay SC operates, the time delay circuit is reset by the restoration of relay DS, but, at the same time, relay AD is operated by the positive battery from AA1, the closed SP relay contacts SP1, wiper AS2 in position 2, CS2 and through the winding of relay AD to negative battery. Relay AD locks from positive battery via AA1, KAGCO, AD3, wiper AS1 in position 2, DAL, wiper AS2 in position 2, SC2, winding of relay AD to negative battery. Relay DS is re-operated by relay AD. The time delay circuit is thus brought into operation again, but the normal charge control resistance VR2 is replaced, through contacts of relay SC, by another variable resistance VR3 preset to give a time delay interval equal to the time taken by the PC switch to step say 8 times.

At the end of this period, i. e. the PC switch having changed the gain by 4 db., relay PA is operated to remove the positive from the stepping circuit, and to give the alarms as previously explained.

Should, however, at the end of this interval the line level have been corrected, the ½ db. relay resets, relay SC is released, and the circuit returns to normal without any alarms being given.

*Case 4.*—In this case the selecting switch AS is set in position 2, and the link DAL omitted. This case is similar to Case 3, except that the stepping is controlled and the alarm given, as described, only when the gain of the circuit is required to be increased, i. e. when the SP1(L) contacts of relay SP operate. When the gain is required to be decreased, although the SP1(H) contacts of relay SP close, they perform no function and the PC switch is permitted to step, if necessary, to its minimum limit position.

*Case 5.*—In this case the selecting switch AS is set to position 3, and the link DAL inserted.

When the line attenuation changes by ±4 db. or more, relay SP closes its contacts one way or the other. At the same time the ½ db. relay SL closes one of its contacts to operate relay DS which starts the time delay equipment. At the end of the initial delay period relay PA operates to operate relay SC, which releases relay DS. Relay DS resets the time delay circuit. The PC switch stepping circuit is then completed. When relay SC operates, a circuit is completed for the slow-operate relay AD from positive battery at AA1 via SP1(H) or (L). Relay AD operates relay DS which restarts the time-delay equipment. The operation of relay PA is now predetermined by the stepping interval controlled by resistance VR3 which is preset to permit the PC switch to make, for instance, six steps, i. e. change the gain by 3 db. If at the end of this time relay SP is still operated, indicating that the level is still 4 db. or more from normal, the alarm is given and no further stepping of the PC switch takes place.

Should, however, the level be less than 4 db. from normal after the PC switch has changed the gain by 3 db., then the contacts of relay SP will now be open to release relays AD and DS and the PC switch is permitted to step until the level is corrected under the control of the ½ db. relay SL.

*Case 6.*—In this case the selecting switch AS is set to position 3, and the link DAL omitted. This case is similar to Case 5, when the gain of the circuit is required to be increased. When the gain is required to be decreased the PC switch is permitted to step if necessary to its minimum limit position (MIN) and then give the alarm.

It will be seen that with this case the range of relay SP has been increased and furthermore if the change is more than 7 db., correction to the extent of 4 db. only is made. This condition is of value if it is anticipated that due to heavy snowfall, for example, a considerable line loss will have to be made good by increase of gain while it is undesirable to increase supervision.

*Case 7.*—In this case the selecting switch AS is set to position 4, and the link DAL inserted. With this arrangement whenever the gain of the circuit is required to be changed by more than ± ½ db. relay SL closes one of its contacts and relay DS operates to start the time-delay equipment. Relays PA and SC subsequently operate. Relay DS releases to reset the time delay equipment. Relay AD operates from positive battery at AA1 extended via KAGCO, wiper AS1 in position 4, DAL, wiper AS2 in position 4, SC2, winding of relay AD to negative battery. Relay AD re-operates relay DS which re-starts the time delay equipment now controlled by the preset resistance VR3 to allow the PC switch to step (say) eight times. Stepping will, however, cease if relay SC releases due to normalising of the pilot level on any one of the steps. Failing this, if the pilot level has not been compensated by the eighth step, stepping then ceases due to the operation of relay PA, and the alarms are given.

*Case 8.*—In this case the selecting switch is set to position 4, and the link DAL omitted. This case is similar to Case 7, when the gain of the circuit is required to be increased. When required to be decreased the PC switch is permitted to step, if necessary, to its minimum limit position (MIN) and there gives the limit alarm.

It will be appreciated from the above description that the system provides a very flexible control over the gain of the line. Thus in conditions of abnormal change in the weather the system may be operated as described, for example, under Cases 5 or 6 above and when a predetermined amount of line loss has been compensated the system might be switched to Case 1 or 2.

*Manual stepping*

The automatic gain control equipment can be prevented from functioning by operating the "AGC Off" key KAGCO. A lamp AGCOL associated with the level control unit glows to indicate the condition, and by means of a push key KSU or KSD the PC switch can be stepped to either increase or decrease the circuit gain.

*Pilot receiver valve fail alarm*

Should the amplifying valve VA of the pilot receiver fail, relay AA restores and AA1 causes the anode alarm lamp AAL to glow and disconnects the positive battery from the level control relays, and the level control unit ceases to function auomatically. AA2 extends positive battery to an external alarm connected to lead 14.

*Automatic gain control test*

The test key KAGCT is operated and inserts a pad of predetermined loss into the line. The response of pilot receiver and the level control unit would then be noted.

Having now particularly described and ascertained the nature of our said invention and in what manner the same is to be performed, what we desire to have protected by Letters Patent will be pointed out in the following claims.

We claim:

1. In a carrier current transmission system, a circuit subject to changes in attenuation and over which modulated carrier currents are received, automatic gain control equipment normally connected with said circuit, receiving means and control means included in said equipment, said receiving means operated responsive to a change in attenuation of said circuit for operating said control means to vary the gain in said circuit, said operation of said control means initiating a predetermined maximum correction in gain, which is less than the total maximum correction of which said control means is capable, for each change in attenuation.

2. In an electrical signalling system, a circuit subject to variations in attenuation and over which modulated carrier currents and an auxiliary alternating current are received, said auxiliary alternating current varying in amplitude in accordance with such variations in attenuation, an automatic gain control device normally connected with said circuit, receiving means included in said device and operated responsive to a change in the amplitude of said auxiliary current for operating said device, each operation of said device causing a predetermined maximum correction in the gain of said circuit for each change in the amplitude of said auxiliary current.

3. A system such as claimed in claim 2, in which there is an automatic stepping switch operated responsive to the operation of said gain control device for performing said correction, and a timing device for controlling the operation of said stepping switch.

4. A system such as claimed in claim 2, including a means operated in response to a change in the amplitude of said auxiliary current of greater than a certain amount for preventing any correction in the gain of said circuit.

5. A system such as claimed in claim 2, including an alarm arrangement controlled responsive to the operation of said gain control device for operating an alarm at certain times.

6. In an electrical signalling system, a circuit subject to variations in attenuation and over which modulated carrier currents and a pilot alternating current are received, amplifying and rectifying means normally connected with said circuit for receiving, amplifying and rectifying said pilot alternating current whereby said variations of attenuation occurring in said circuit may be detected, a plurality of compensating resistance pads, sensitive relay means operated by said amplified and rectified pilot current in response to a variation of said attenuation, control relay means operated in response to the operation of said sensitive relay means, time delaying means operated in response to the operation of said control relay means, an automatic stepping switch having access to said resistance pads, and means operated under control of said delaying means for operating said automatic stepping switch to introduce a particular one of said resistance pads into said transmission circuit to compensate for said variation in said attenuation.

7. An electrical system such as claimed in claim 6, wherein said time delaying means comprises an electron discharge device, a relay, a condenser, a non-linear resistance disc, a plurality of non-variable resistances, a plurality of variable resistances, and contacts controlled by said control relay.

8. An electrical system such as claimed in claim 6, including a manually operable cut-off key for preventing the automatic operation of said stepping switch, and an increasing push key and a decreasing push key each manually operable at different times subsequent to an operation of said cut-off key for completing a circuit to operate said automatic stepping switch for introducing different ones of said resistance pads into said transmission circuit to respectively increase or decrease the gain of said transmission circuit.

9. In an electrical signalling system, a circuit subject to changes in attenuation and over which modulated carrier currents and a pilot alternating current are received, a sensitive relay, receiving means normally connected to said circuit and operated responsive to receiving said pilot alternating current for detecting variations of attenuation, said sensitive relay operated by said receiving means in response to an abnormal variation in either direction of attenuation in said circuit, control relay means operated in response to said operation of said sensitive relay, time delaying means operated in response to the operation of said control relay means for preventing further operation of said control relay means for a predetermined time interval, an alarm arrangement for operating an alarm, means for restoring said time delay means after the expiration of said predetermined time interval, means operated in response to the restoration of said time delay means for introducing a correction in said transmission circuit to compensate for an abnormal variation of attenuation in one direction, and means operated in response to the restoration of said time delay means for operating said alarm in case the abnormal variation of attenuation is in the other direction.

10. An electrical signalling system such as claimed in claim 9, including a manually settable control switch having a first and a second wiper each having a plurality of positions, a first contact on said sensitive relay connected to said first wiper, a second contact on said sensitive relay connected to said second wiper, circuits completed over said contacts and said wipers for operating said control relay means in response to the operation of said sensitive relay, and means, dependent upon which one of said plurality of positions said wipers have been set and dependent upon the direction of said abnormal variation, for at times operating said alarm and for at other times introducing corrections to compensate for said attenuation variations.

11. An electrical signalling system such as claimed in claim 9, including a jumper link for connecting said first and said sensitive second relay contacts in multiple, whereby said alarm is operated in response to the operation of said sensitive relay irrespective of the direction and value of said abnormal variation of said attenuation.

12. In an electrical signalling system, a circuit subject to changes in attenuation and over which modulated carrier currents and a pilot alternating current are received, an automatic gain control arrangement connected with said circuit comprising a receiving unit and a control unit for compensating for variations from normal of said pilot alternating current, amplifying and rectifying means included in said receiving unit for receiving, amplifying and rectifying said pilot alternating current to detect variations of attenuation occurring in said transmission circuit, a plurality of compensating resistance pads, said control unit including control relay means, a time delaying means and an automatic stepping switch, sensitive relay means also included in said control unit and operated by said amplified and rectified pilot current in response to receipt of a variation of said attenuation for operating said control relay means, said time delaying means operated by said control relay means for delaying further operation of said control relay means during a predetermined time interval, means operated responsive to the expiration of said time interval for preparing said automatic switch for operation and for restoring said delaying means to normal, and means controlled responsive to said restoration of said delaying means for operating said stepping switch under control of said sensitive relay means, said operation of said stepping switch introducing a particular one of said resistance pads into said transmission circuit to compensate for said variation in said attenuation.

TESEO BRUNO DANTE TERRONI.
JOHN ERNEST THOMAS PARKER.

REFERENCES CITED

The following references are of record in the file of this patent:

UNITED STATES PATENTS

| Number | Name | Date |
|---|---|---|
| 1,611,350 | Jammer | Dec. 21, 1926 |
| 1,695,000 | Wolff | Dec. 11, 1928 |
| 1,746,241 | Clark et al. | Feb. 11, 1930 |
| 1,993,860 | Roberts | Mar. 12, 1935 |
| 2,037,753 | Barton | Apr. 21, 1936 |
| 2,067,320 | Hamilton | Jan. 12, 1937 |
| 2,069,853 | Schade | Feb. 9, 1937 |
| 2,101,832 | Barton | Dec. 14, 1937 |
| 2,160,097 | Weathers | May 30, 1939 |
| 2,414,609 | Rhenbottom | Jan. 21, 1947 |